United States Patent
Wu

(10) Patent No.: US 8,441,157 B2
(45) Date of Patent: May 14, 2013

(54) POWER SUPPLY SYSTEM AND PORTABLE ELECTRONIC DEVICE USING THE SAME

(75) Inventor: Te-Lung Wu, Taipei Hsien (TW)

(73) Assignee: Wistron Corporation, Xizhi Dist., New Taipei (TW)

( * ) Notice: Subject to any disclaimer, the term of this patent is extended or adjusted under 35 U.S.C. 154(b) by 490 days.

(21) Appl. No.: 12/894,153

(22) Filed: Sep. 30, 2010

(65) Prior Publication Data
US 2011/0169330 A1    Jul. 14, 2011

(30) Foreign Application Priority Data
Jan. 12, 2010    (TW) .............................. 99100683 A

(51) Int. Cl.
*H02J 7/00*    (2006.01)
(52) U.S. Cl.
USPC ........................................................ 307/150
(58) Field of Classification Search .................... 307/150
See application file for complete search history.

(56) References Cited

FOREIGN PATENT DOCUMENTS
CN    2510913 Y    9/2002

OTHER PUBLICATIONS
Office action mailed on Aug. 31, 2012 for the China application No. 201010000869.8, p. 3 line 3-35, p. 4, p. 5 line 1-16.

*Primary Examiner* — Robert L. Deberadinis
(74) *Attorney, Agent, or Firm* — Winston Hsu; Scott Margo

(57) ABSTRACT

A power supply system includes a transformer for converting an external AC power into an external DC power, a battery for providing a battery power, a selection module for outputting the external DC power or the battery power, a first-stage DC conversion module for converting power provided by the selection module into a first DC power, a plurality of second-stage DC conversion module, each for converting an input power into a second DC power, and a switching module for switching to output the battery power or the first DC power of the first-stage DC conversion module as the input power of each of the plurality of second-stage DC conversion module according to the external DC power.

12 Claims, 4 Drawing Sheets

US 8,441,157 B2

POWER SUPPLY SYSTEM AND PORTABLE ELECTRONIC DEVICE USING THE SAME

BACKGROUND OF THE INVENTION

1. Field of the Invention

The present invention relates to a power supply system and portable electronic device, and more particularly, to a power supply system and portable electronic device capable of significantly improving power conversion efficiency by adding a few elements in a conventional structure.

2. Description of the Prior Art

With the advancement of technology and industry, portable electronic devices, such as laptops, mobile phones, digital cameras, MP3 players, are widely used in the daily life. Nowadays, a portable electronic device is generally expected to have a compact size, high system performance and longer duration for portable use. However, once the system performance increases, so does power consumption of the system, which reduces battery duration. Therefore, there is a trade-off between the system performance and the battery duration.

Conventionally, there are only two methods for enhancing the battery duration: one is to expand battery capacity, which increases production cost; the other is to utilize high-efficiency elements to reduce energy loss during a power conversion process, which increases design cost. As can be seen from the above, enhancing the battery duration needs to significantly increase manufacturing cost, causing a higher selling price and lower competitiveness.

Therefore, how to significantly enhance the battery duration without adding too much manufacturing cost has become an issue in industry.

SUMMARY OF THE INVENTION

Therefore, an objective of the present invention is to provide a power supply system and portable electronic device.

The present invention discloses a power supply system, for enhancing a duration of portable use of a portable electronic device. The power supply system includes a transformer, for receiving an external alternating current (AC) power, to transform the external AC power into an external direct current (DC) power; a battery, for storing electric energy, to provide a battery power; a selection module, for outputting the external DC power or the battery power according to an electrical connection status between the external AC power and the transformer; a first-stage DC conversion module, coupled to the selection module, for converting power provided by the selection module into a first DC power; a plurality of second-stage DC conversion modules, each for converting an input power into a second DC power; and a switching module, coupled to the external DC power, the battery power, the first-stage DC conversion module and the plurality of second-stage DC conversion modules, for switching to output the battery power or the first DC power as the input power of each of the plurality of second-stage DC conversion modules according to the external DC power.

The present invention further discloses a portable electronic device, capable of enhancing battery duration. The portable electronic device includes an operating circuit and a power supply system. The operating circuit includes a plurality of operating modules, for executing a plurality of operating functions. The power supply system includes a transformer, for receiving an external alternating current (AC) power, to transform the external AC power into an external direct current (DC) power; a battery, for storing electric energy, to provide a battery power; a selection module, for outputting the external DC power or the battery power according to an electrical connection status between the external AC power and the transformer; a first-stage DC conversion module, coupled to the selection module, for converting power provided by the selection module into a first DC power; a plurality of second-stage DC conversion modules, each for converting an input power into a second DC power, to provide the second DC power to the plurality of operating modules; and a switching module, coupled to the external DC power, the battery power, the first-stage DC conversion module and the plurality of second-stage DC conversion modules, for switching to output the battery power or the first DC power as the input power of each of the plurality of second-stage DC conversion modules according to the external DC power.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
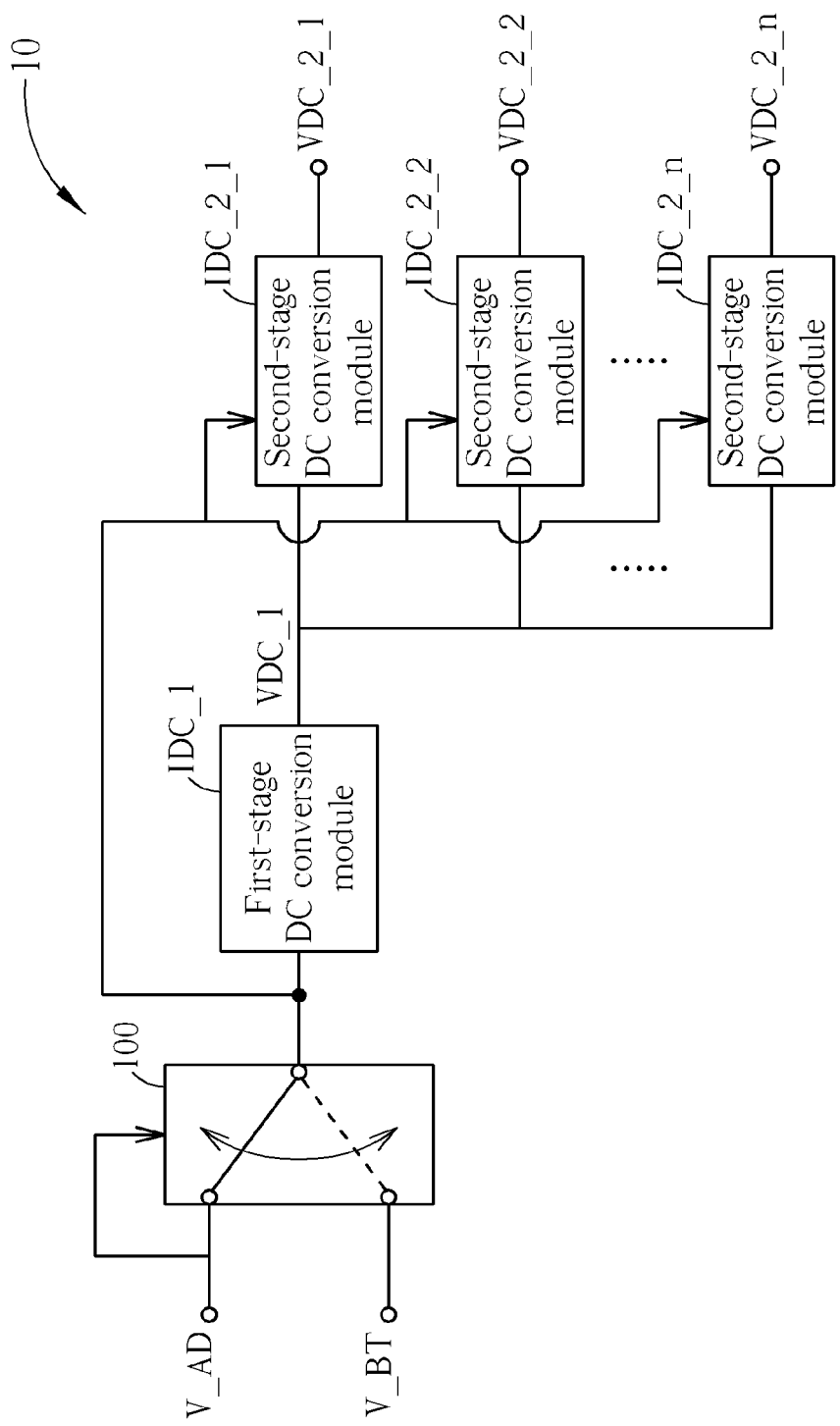
FIG. 1 is a schematic diagram of a conventional power supply system.

The present invention focuses on electronic devices with a "multi-stage power supply structure". A main objective of the present invention is to add a few elements to the conventional structure to improve power conversion efficiency, so as to reduce conversion loss and enhance battery duration. First of all, the "multi-stage power supply structure" is a power supply structure widely used in portable electronic devices with high electricity consumption, such as laptops, and can be simplified as a power supply system 10, as shown in FIG. 1. The power supply system 10 is utilized for converting an external direct current (DC) power V_AD or a battery power V_BT into proper DC powers VDC_2_1~VDC_2_$n$, and includes a selection module 100, a first-stage DC conversion module IDC_1 and second-stage DC conversion modules IDC_2_1~IDC_2_$n$. The external DC power V_AD indicates a DC power generated by or transformed from an external power. Take a laptop for example, a transformer is typically utilized for transforming home-plug power, i.e. alternating current (AC) power, into 19V DC power. The battery power V_BT indicates a DC power outputted by a rechargeable battery, and is often lower than the external DC power V_AD, i.e. between 12V~16V. The DC powers VDC_2_1~VDC_2_$n$ indicate different powers required by different operating modules of an operating circuit for executing corresponding operating functions, and voltages of the DC powers VDC_2_1~VDC_2_$n$ may be identical or different according to system requirements. Noticeably, FIG. 1 is merely utilized for illustrating the multi-stage power supply structure, such that circuit elements unrelated to the objective of the present invention, such as a charging circuit, are omitted, which should be readily known by those skilled in the art, and is not narrated hereinafter.

Figure 2:
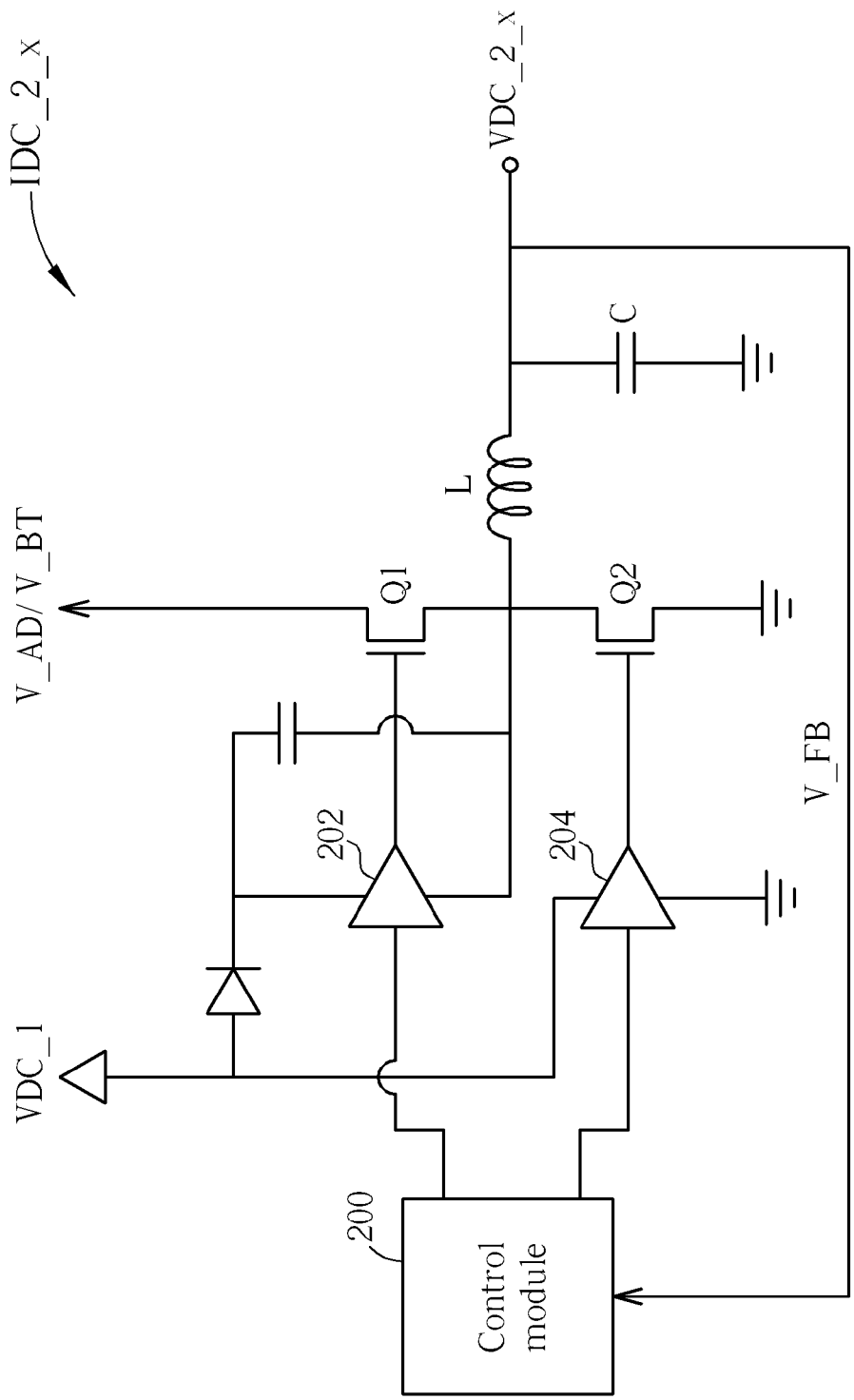
FIG. 2 is a schematic diagram of a second-stage DC conversion module shown in FIG. 1.

In FIG. 1, the selection module 100 selects to output the external DC power V_AD or the battery power V_BT to the first-stage DC conversion module IDC_1. The selecting logic thereof is: if the external DC power V_AD is greater than a predefined value, which indicates an external power is connected, the selection module 100 outputs the external DC power V_AD; otherwise, the selection module 100 outputs the battery power V_BT. The first-stage DC conversion module IDC_1 is electrically connected with the selection module 100, and is utilized for converting power provided by the selection module 100 into a 5V DC power VDC_1, and then providing the DC power VDC_1 for the second-stage DC conversion modules IDC_2_1~IDC_2_n. The second-stage DC conversion modules IDC_2_1~IDC_2_n are connected with the first-stage DC conversion module IDC_1 and the selection module 100, and can be driven by the DC power VDC_1 to convert the DC power V_AD or the battery power V_BT provided by the selection module 100 into the DC powers VDC_2_1~VDC_2_n, to supply different operating modules of the operating circuit. Generally, operations of the first-stage DC conversion module IDC_1 and the second-stage DC conversion modules IDC_2_1~IDC_2_n are similar, and a pulse width modulation (PWM) scheme (e.g. buck converter) is widely applied for converting DC power. Please refer to FIG. 2, which is a schematic diagram of a second-stage DC conversion module IDC_2_x. In the second-stage DC conversion module IDC_2_x, a control module 200 is a PWM controller. The control module 200 is utilized for controlling duty cycles of switch transistors Q1, Q2 via drivers 202, 204 according to a feedback signal V_FB, so as to utilize capacitance and inductance effects generated by an inductor L and a capacitor C to convert the DC power V_AD or the battery power V_BT into the proper DC power VDC_2_X.

For the circuit structure, regardless of magnitude of the DC power VDC_1, as long as the voltage level of the DC power VDC_1 can drive the control module 200 to normally operate, the second-stage DC conversion module IDC_2_x can convert the DC power V_AD or the battery power V_BT into the DC power VDC_2_x. However, in practical, the switch transistors Q1, Q2 have limited tolerance voltages. If excessive power is applied to gates of the switch transistors Q1, Q2, voltage differences between the gates and sources instantly rise and cause the switch transistors Q1, Q2 burnt out. To prevent this situation, manufacturers of transistors provide information about tolerance voltages of the transistors for designer's reference. Certainly, a transistor with a higher tolerance voltage is sold at a higher price. Generally, the tolerance voltages between the gates and the sources of the switch transistors Q1, Q2 of the second-stage DC conversion modules IDC_2_1~IDC_2_n are 20V. In other words, if the external DC power V_AD with a high voltage (around 19V) is directly applied to the second-stage DC conversion modules IDC_2_1~IDC_2_n, the second-stage DC conversion modules IDC_2_1~IDC_2_n are likely to be burnt out, and this is why the power supply system 10 applies the two-stage DC conversion scheme.

Magnitude of the input power affects whether the second-stage DC conversion modules IDC_2_1~IDC_2_n are burnt out, as well as the power conversion efficiency. The power conversion efficiency is affected by unideal factors in the circuit, such as conduction resistances between the drains and the sources of the switch transistors Q1, Q2. The conduction resistances are further related to the voltage differences between the gates and the sources. Generally, when the voltage differences between the drains and the sources of the switch transistors Q1, Q2 are the same, higher voltage differences between the gates and the sources can lower the conduction resistances, such that the power conversion efficiency is enhanced, i.e. conversion loss is reduced.

Therefore, in order to enhance battery duration, when the system utilizes the battery power V_BT, the present invention increases voltages for driving the second-stage DC conversion modules IDC_2_1~IDC_2_n, to reduce the conduction resistances of the switch transistors Q1, Q2, so as to enhance the power conversion efficiency. Please refer to FIG. 3A, which is a schematic diagram of a power supply system 30 according to an embodiment of the present invention. For clearly illustrating the concept of the present invention, elements denoted by the same symbols and names in the power supply systems 10 and 30 perform the same functions. Therefore, by comparing FIG. 1 and FIG. 3A, the power supply system 30 can be seen as adding a switching module 300 between the first-stage DC conversion module IDC_1 and a node ND to the power supply system 10. The switching module 300 is utilized for taking the battery power V_BT as the input power of the second-stage DC conversion modules IDC_2_1~IDC_2_n when the power supply system 30 utilizes the battery power V_BT. Operations of other elements of the power supply system 30, such as the selection module 100, the first-stage DC conversion module IDC_1 and the second-stage DC conversion modules IDC_2_1~IDC_2_n, can be referred to the above description, and are not narrated hereinafter.

The voltage of the battery power V_BT is between 12V~16V, and is far below the tolerance voltages between the gates and the sources of the switch transistors Q1, Q2. Therefore, the battery power V_BT is suitable for the input power of the second-stage DC conversion modules IDC_2_1~IDC_2_n, to enhance the power conversion efficiency and reduce the energy loss when the battery power V_BT is utilized, as well as enhance battery duration.

Figure 3A:
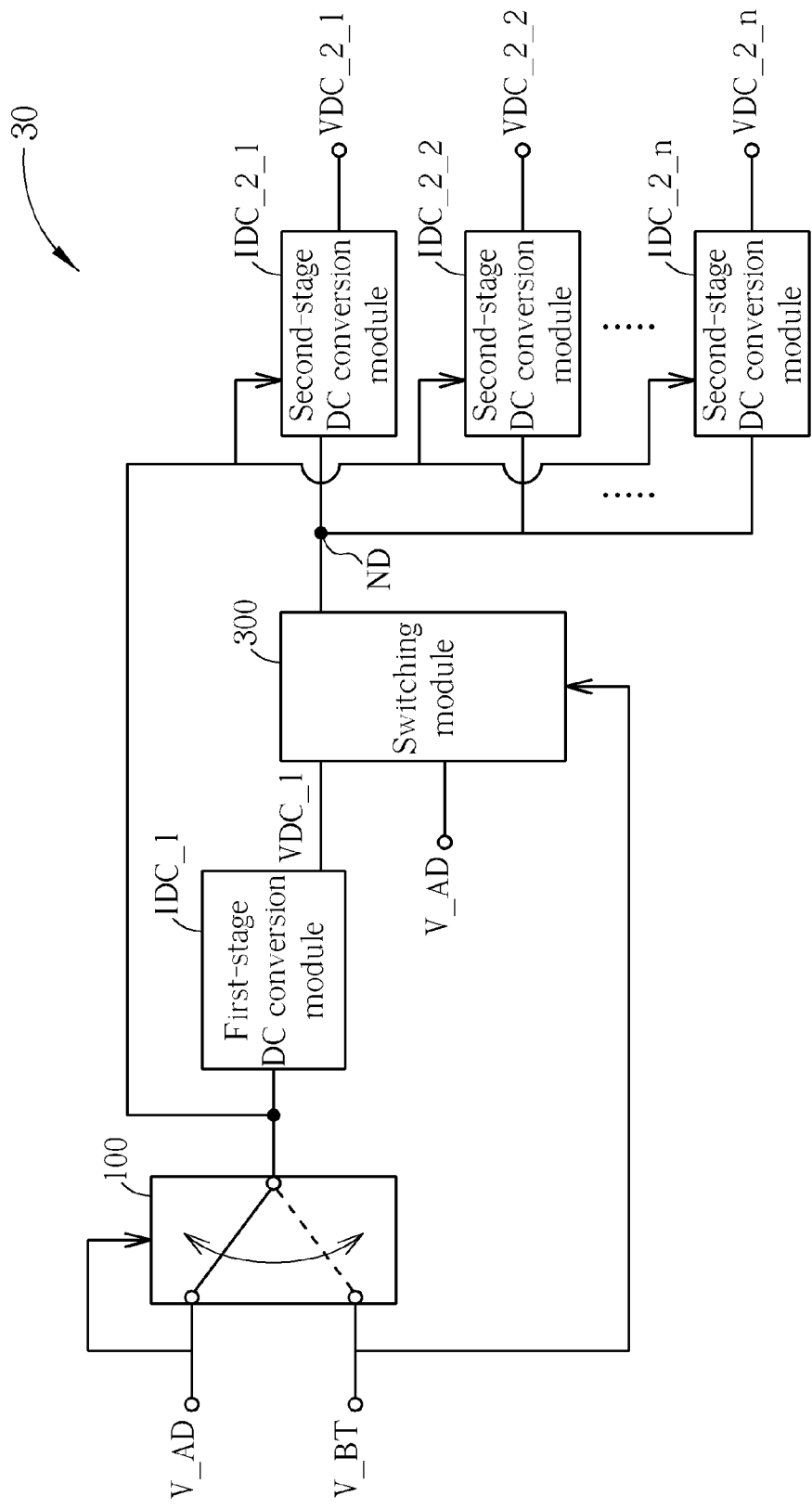
FIG. 3A is a schematic diagram of a power supply system according to an embodiment of the present invention.
Figure 3B:
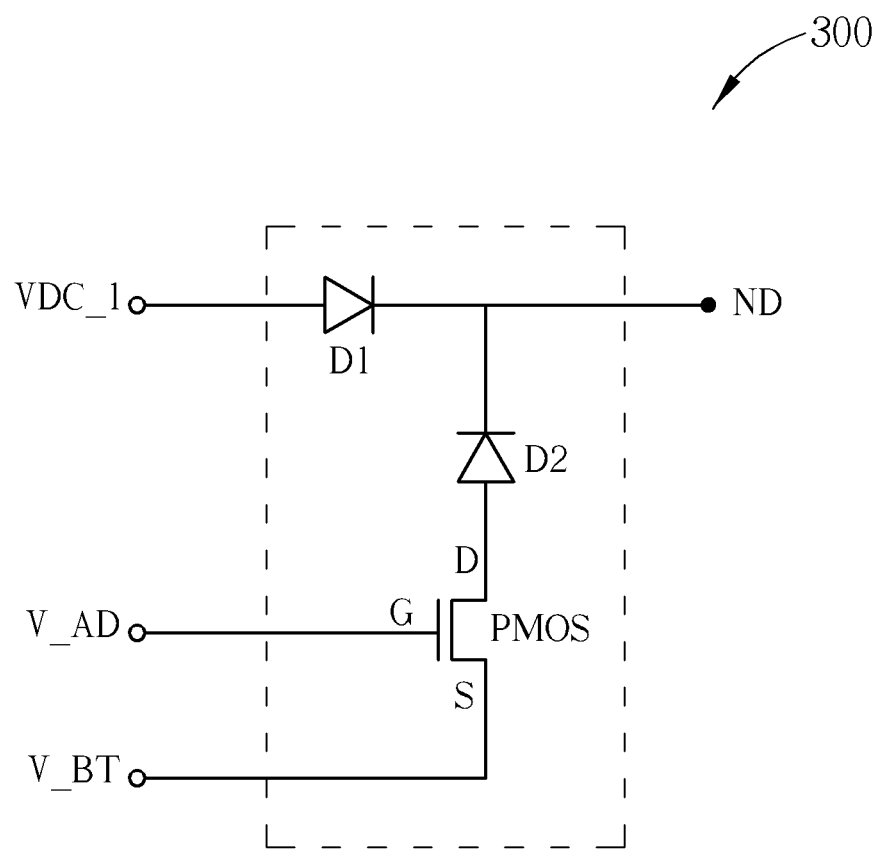
FIG. 3B is a schematic diagram of a switching module shown in FIG. 3A.

In detail, please refer to FIG. 3B, which is a schematic diagram of the switching module 300 shown in FIG. 3A. The switching module 300 includes a P-type transistor PMOS and diodes D1, D2. In the P-type transistor PMOS, a drain D is coupled to a terminal of the diode D2, a gate G is coupled to the external DC power V_AD, and a source S is coupled to the battery power V_BT. Therefore, when the system is not connected to an external power, the external DC power V_AD is 0, and the battery power V_BT is between 12V~16V, such that the P-type transistor PMOS is conducted and thus the battery power V_BT can be transferred to the second-stage DC conversion modules IDC_2_1~IDC_2_n via the diode D2. Meanwhile, a voltage of the node ND (approximately equal to the voltage of the battery power V_BT minus a threshold voltage of the diode D2) is greater than the 5V DC power VDC_1. Thus, the diode D1 is turned off, which avoids the battery power V_BT from flowing into the first-stage DC conversion module IDC_1.

Therefore, via the switching module 300, when the system is connected with an external power, the power supply system 30 utilizes the DC power VDC_1 as the input power of the second-stage DC conversion modules IDC_2_1~IDC_2_n. When the system is not connected with an external power, the power supply system 30 utilizes the battery power V_BT as the input power of the second-stage DC conversion modules IDC_2_1~IDC_2_n. As a result, when a portable electronic device utilizes a battery, the present invention can effectively reduce the conduction resistances of the second-stage DC conversion modules IDC_2_1~IDC_2_n, so as to enhance the power conversion efficiencies of the second-stage DC conversion modules IDC_2_1~IDC_2_n. As a result, the energy loss during the power conversion process can be reduced. In other words, power consumption of the battery can be reduced, so as to enhance the battery duration.

Noticeably, FIG. 3A and FIG. 3B are utilized for illustrating the spirit of the present invention, and other circuits capable of timely switching the battery power V_BT to the input power of the second-stage DC conversion modules IDC_2_1~IDC_2_n can be applied in the present invention as well. Besides, in the power supply system 30, other elements unrelated to the objective of the present invention are omitted, and those skilled in the art should make proper modifications according to requirements. For example, the above description takes the two-stage structure as an example, while in practical, other multi-stage power supply systems can be applied in the present invention as well. Also, the amount of DC conversion modules in each stage is not limited, and depends on system requirements. In addition, in FIG. 3A, the first-stage DC conversion module IDC_1 and the second-stage DC conversion modules IDC_2_1~IDC_2_n can utilize other DC conversion methods, which are not limited to PWM. Furthermore, the switching module 300 is utilized for timely switching the battery power V_BT to the input power of the second-stage DC conversion modules IDC_2_1~IDC_2_n, and avoiding the battery power V_BT from flowing back to the first-stage DC conversion module IDC_1 or preventing the DC power VDC_1 outputted by the first-stage DC conversion module IDC_1 from flowing into the rechargeable battery. Devices or circuits capable of achieving the above objective can be utilized for realizing the switching module 300, and are not limited to the example shown in FIG. 3B.

Using the switching module 300, the portable electronic device can effectively enhance the power conversion efficiency when powered by a battery, so as to reduce energy loss, and enhance the battery duration. According to experimental results, when the input power of the second-stage DC conversion modules IDC_2_1~IDC_2_n changes from the 5V DC power VDC_1 to the battery power of 12V~16V, the conduction resistances of the switch transistors Q1, Q2 are reduced by 17~40%, such that the power conversion loss can be effectively reduced. More importantly, manufacturing cost of the switching module 300 in FIG. 3B is less than 10 US cents. In other words, the present invention significantly enhances the power conversion efficiency as well as the battery duration, but only needs to add a few manufacturing cost.

To sum up, for an electronic device using the "multi-stage power supply structure", the present invention only needs to add a few elements to the conventional structure, but significantly improves the power conversion efficiency, reduces the conversion loss and enhances the battery duration, so as to enhance the competitiveness of the portable electronic device.

Those skilled in the art will readily observe that numerous modifications and alterations of the device and method may be made while retaining the teachings of the invention.

What is claimed is:

1. A power supply system, for enhancing a duration of portable use of a portable electronic device, comprising:
   a transformer, for receiving an external alternating current (AC) power, to transform the external AC power into an external direct current (DC) power;
   a battery, for storing electric energy, to provide a battery power;
   a selection module, for outputting the external DC power or the battery power according to an electrical connection status between the external AC power and the transformer;
   a first-stage DC conversion module, coupled to the selection module, for converting power provided by the selection module into a first DC power;
   a plurality of second-stage DC conversion modules, each for converting an input power into a second DC power; and
   a switching module, coupled to the external DC power, the battery power, the first-stage DC conversion module and the plurality of second-stage DC conversion modules, for switching to output the battery power or the first DC power as the input power of each of the plurality of second-stage DC conversion modules according to the external DC power.

2. The power supply system of claim 1, wherein the selection module outputs the external DC power to the first-stage DC conversion module when the external AC power is electrically connected to the transformer.

3. The power supply system of claim 1, wherein the selection module outputs the battery power to the first-stage DC conversion module when the external AC power is not electrically connected to the transformer.

4. The power supply system of claim 1, wherein the switching module comprises:
   a transistor, comprising a first terminal coupled to the external DC power, a second terminal coupled to the battery power, and a third terminal, for conducting signal connection from the second terminal to the third terminal according to a voltage of the external DC power of the first terminal;
   a first diode, coupled between the first-stage DC conversion module and the plurality of second-stage DC conversion modules; and
   a second diode, coupled between the third terminal of the transistor and the plurality of second-stage DC conversion modules.

5. The power supply system of claim 4, wherein the transistor is a P-type metal oxide semiconductor field effect transistor, the first terminal is a gate, the second terminal is a source, and the third terminal is a drain.

6. The power supply system of claim 4, wherein a voltage of the first DC power is smaller than a voltage of the battery power.

7. A portable electronic device capable of enhancing battery duration, comprising:
   an operating circuit, comprising a plurality of operating modules, for executing a plurality of operating functions; and
   a power supply system, comprising:
      a transformer, for receiving an external alternating current (AC) power, to transform the external AC power into an external direct current (DC) power;
      a battery, for storing electric energy, to provide a battery power;
      a selection module, for outputting the external DC power or the battery power according to an electrical connection status between the external AC power and the transformer;
      a first-stage DC conversion module, coupled to the selection module, for converting power provided by the selection module into a first DC power;
      a plurality of second-stage DC conversion modules, each for converting an input power into a second DC power, to provide the second DC power to the plurality of operating modules; and
      a switching module, coupled to the external DC power, the battery power, the first-stage DC conversion module and the plurality of second-stage DC conversion modules, for switching to output the battery power or the first DC power as the input power of each of the plurality of second-stage DC conversion modules according to the external DC power.

8. The portable electronic device of claim 7, wherein the selection module outputs the external DC power to the first-stage DC conversion module when the external AC power is electrically connected to the transformer.

9. The portable electronic device of claim 7, wherein the selection module outputs the battery power to the first-stage DC conversion module when the external AC power is not electrically connected to the transformer.

10. The portable electronic device of claim 7, wherein the switching module comprises:
- a transistor, comprising a first terminal coupled to the external DC power, a second terminal coupled to the battery power, and a third terminal, for conducting signal connection from the second terminal to the third terminal according to a voltage of the external DC power of the first terminal;
- a first diode, coupled between the first-stage DC conversion module and the plurality of second-stage DC conversion modules; and
- a second diode, coupled between the third terminal of the transistor and the plurality of second-stage DC conversion modules.

11. The portable electronic device of claim 10, wherein the transistor is a P-type metal oxide semiconductor field effect transistor, the first terminal is a gate, the second terminal is a source, and the third terminal is a drain.

12. The portable electronic device of claim 10, wherein a voltage of the first DC power is smaller than a voltage of the battery power.

* * * * *